(12) United States Patent
Samata

(10) Patent No.: US 11,574,398 B2
(45) Date of Patent: Feb. 7, 2023

(54) INSPECTION METHOD FOR ROTATING ELECTRIC MACHINE, ROTATING ELECTRIC MACHINE, AND INSPECTION SYSTEM FOR ROTATING ELECTRIC MACHINE

(71) Applicant: Mitsubishi Electric Corporation, Tokyo (JP)

(72) Inventor: Kohei Samata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 47 days.

(21) Appl. No.: 17/427,093

(22) PCT Filed: Mar. 8, 2019

(86) PCT No.: PCT/JP2019/009359
§ 371 (c)(1),
(2) Date: Jul. 30, 2021

(87) PCT Pub. No.: WO2020/183526
PCT Pub. Date: Sep. 17, 2020

(65) Prior Publication Data
US 2022/0101515 A1 Mar. 31, 2022

(51) Int. Cl.
*G06T 7/00* (2017.01)
*H02K 7/18* (2006.01)

(52) U.S. Cl.
CPC .......... *G06T 7/0004* (2013.01); *H02K 7/1823* (2013.01)

(58) Field of Classification Search
None
See application file for complete search history.

(56) References Cited

U.S. PATENT DOCUMENTS 6,471,566 B1 * 10/2002 Mikhaylich ............. B24B 37/32
451/60
6,506,312 B1 * 1/2003 Bottomfield .......... C23C 14/564
204/298.31
(Continued)

FOREIGN PATENT DOCUMENTS

JP      55-71940 A    5/1980
JP      5-30716 A     2/1993
(Continued)

OTHER PUBLICATIONS

International Search Report and Written Opinion dated May 28, 2019, received for PCT Application PCT/JP2019/009359, Filed on Mar. 8, 2019, 9 pages including English Translation.

*Primary Examiner* — Stefan Gadomski
(74) *Attorney, Agent, or Firm* — Xsensus LLP

(57) ABSTRACT

Provided an inspection method for a rotating electric machine, including: a first step of acquiring a first image by imaging a pattern formed on an outer peripheral surface of a retaining ring over an entire circumference of the retaining ring with use of an image pickup element mounted to a non-rotating portion of the rotating electric machine under a state in which the retaining ring is rotated; a second step of acquiring a second image by imaging the pattern over the entire circumference of the retaining ring with use of the image pickup element under the state in which the retaining ring is rotated, the second step being executed after the first step with an operation of the rotating electric machine interposed; and a third step of acquiring a distortion distribution of the retaining ring based on the first image and the second image.

8 Claims, 15 Drawing Sheets

(56) References Cited

U.S. PATENT DOCUMENTS

| | | | | |
|---|---|---|---|---|
| 2007/0044913 A1* | 3/2007 | Wang | ................... | B24B 37/32 |
| | | | | 156/345.12 |
| 2015/0273649 A1* | 10/2015 | Kosuge | ............... | B24B 37/0053 |
| | | | | 451/5 |
| 2016/0252464 A1* | 9/2016 | Ito | ........................ | G01L 5/00 |
| | | | | 348/128 |
| 2019/0283209 A1* | 9/2019 | Osterheld | ............... | B24B 49/12 |

FOREIGN PATENT DOCUMENTS

| | | |
|---|---|---|
| JP | 8-65975 A | 3/1996 |
| JP | 2014-121166 A | 6/2014 |

* cited by examiner

INSPECTION METHOD FOR ROTATING ELECTRIC MACHINE, ROTATING ELECTRIC MACHINE, AND INSPECTION SYSTEM FOR ROTATING ELECTRIC MACHINE

CROSS-REFERENCE TO RELATED APPLICATION

The present application is based on PCT filing PCT/JP2019/009359, filed Mar. 8, 2019, the entire contents of which are incorporated herein by reference.

TECHNICAL FIELD

The present invention relates to an inspection method for a rotating electric machine including a retaining ring mounted to an axial end portion of a rotor core, a rotating electric machine, and an inspection system for a rotating electric machine.

BACKGROUND ART

In Patent Literature 1, there is described a rotating electric machine. The rotating electric machine includes a rotor core including magnetic poles and an inter-pole portion, a plurality of slots provided in the inter-pole portion of the rotor core in a circumferential direction, rotor windings mounted in the slots, and retaining rings which are mounted to both longitudinal end portions of the rotor core, and are configured to retain end portions of the rotor windings projecting from the rotor core against a centrifugal force.

CITATION LIST

Patent Literature

[PTL 1] JP 2014-121166 A

SUMMARY OF INVENTION

Technical Problem

In the rotating electric machine described above, the retaining rings are deformed so as to expand in a radial direction by a centrifugal force generated by rotation of a rotor. Thus, when activation and stop of the rotating electric machine are repeated, the retaining rings are repeatedly deformed. When the retaining rings are repeatedly deformed, there is a fear in that a defect such as cracking or breakage may occur in the retaining rings. Thus, in general, in rotating electric machines, visual inspection of retaining rings is periodically performed.

When the visual inspection of the retaining rings is performed, the rotor is pulled out from a stator under a state in which the rotating electric machine is stopped, and the presence or absence of a defect in the retaining rings is visually inspected. It is required to pull out the rotor from the stator. Thus, the visual inspection of the retaining rings cannot be executed during an operation period of the rotating electric machine, and further, an execution frequency of the visual inspection of the retaining rings is limited to once every several years. Meanwhile, a defect in the retaining rings is usually liable to occur during the operation period of the rotating electric machine. Thus, there is a problem in that, even when no defect is observed in the retaining rings during the visual inspection, a defect may occur in the retaining rings during an operation period until next visual inspection is performed.

The present invention has been made to solve the problem as described above, and has an object to obtain an inspection method for a rotating electric machine, a rotating electric machine, and an inspection system for a rotating electric machine with which a retaining ring can be inspected during an operation period of the rotating electric machine.

Solution to Problem

According to the present invention, there is provided an inspection method for a rotating electric machine, including: a first step of acquiring a first image by imaging a pattern formed on an outer peripheral surface of a retaining ring mounted to an axial end portion of a rotor core of the rotating electric machine over an entire circumference of the retaining ring with use of an image pickup element mounted to a non-rotating portion of the rotating electric machine under a state in which the retaining ring is rotated; a second step of acquiring a second image by imaging the pattern over the entire circumference of the retaining ring with use of the image pickup element under the state in which the retaining ring is rotated, the second step being executed after the first step with an operation of the rotating electric machine interposed; and a third step of acquiring a distortion distribution of the retaining ring based on the first image and the second image.

According to the present invention, there is provided a rotating electric machine, including: a non-rotating portion including a stator; a rotor rotatably provided to an inner peripheral side of the stator; and an image pickup element mounted to the non-rotating portion, wherein the rotor includes: a rotor core; and a retaining ring mounted to an end portion of the rotor core in an axial direction of the rotor, and wherein the image pickup element is configured to image a pattern formed on an outer peripheral surface of the retaining ring.

According to the present invention, there is provided an inspection system for a rotating electric machine, including: the rotating electric machine of the present invention; and a computer configured to acquire a distortion distribution of the retaining ring based on an image acquired from the image pickup element.

Advantageous Effects of Invention

According to the present invention, the retaining ring can be inspected during the operation period of the rotating electric machine.

DESCRIPTION OF EMBODIMENTS

First Embodiment

Figure 1:
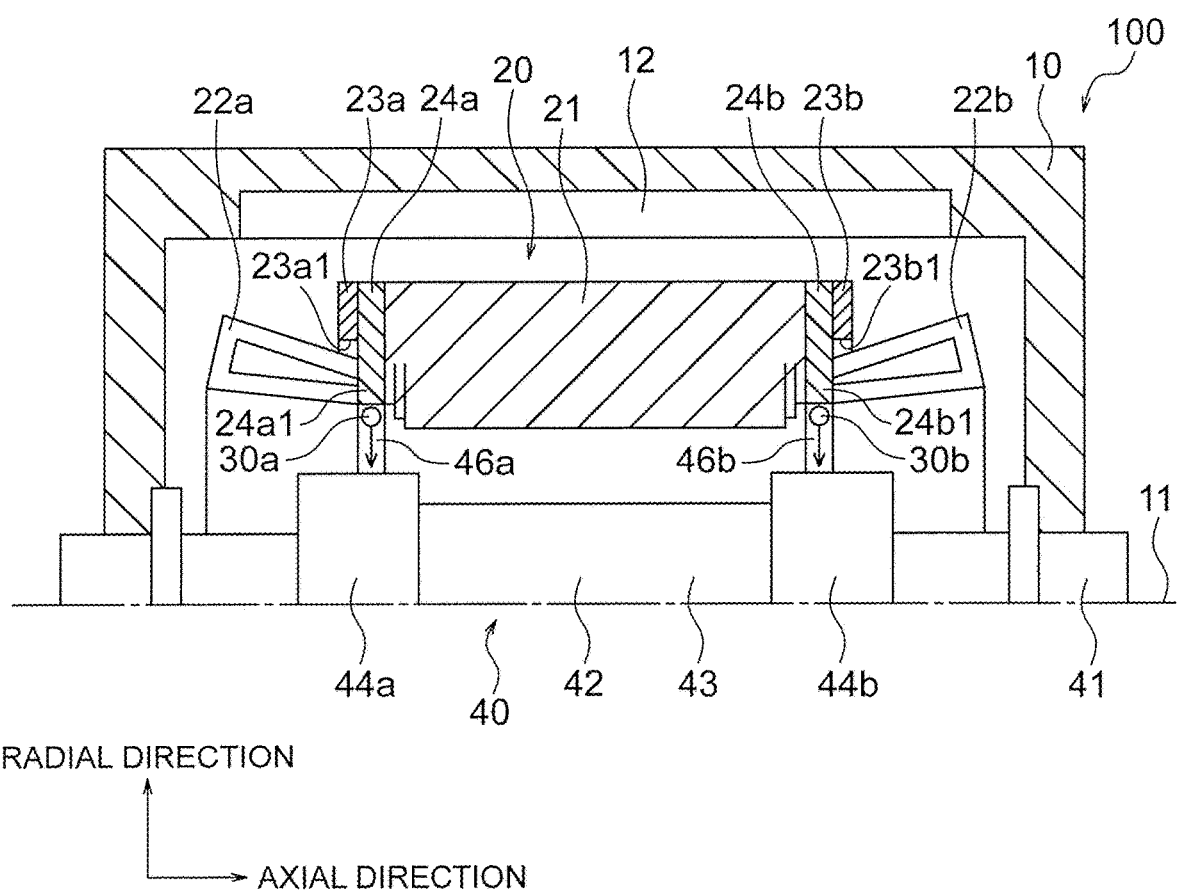
FIG. 1 is a sectional view for illustrating a configuration of a turbine generator according to a first embodiment of the present invention.
Figure 2:
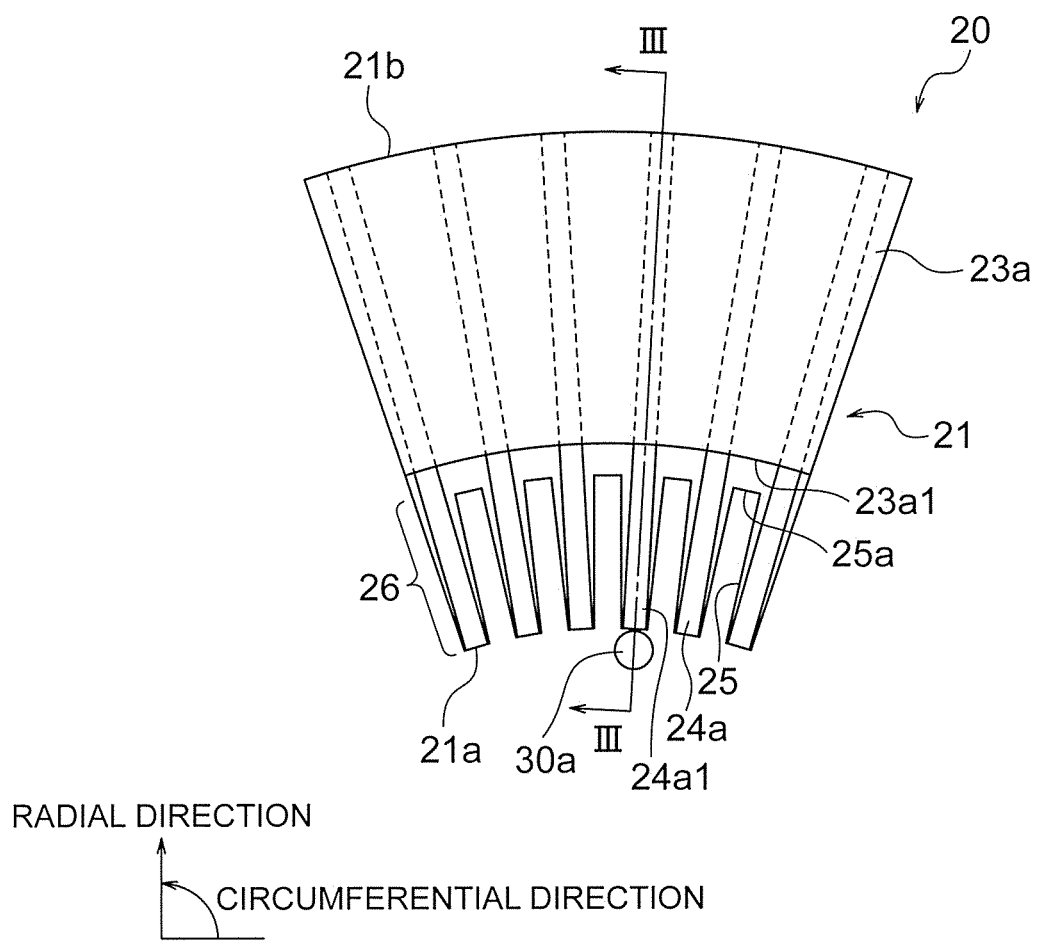
FIG. 2 is a view for illustrating a configuration of a part of a stator in the turbine generator according to the first embodiment of the present invention as viewed along an axial direction.
Figure 3:
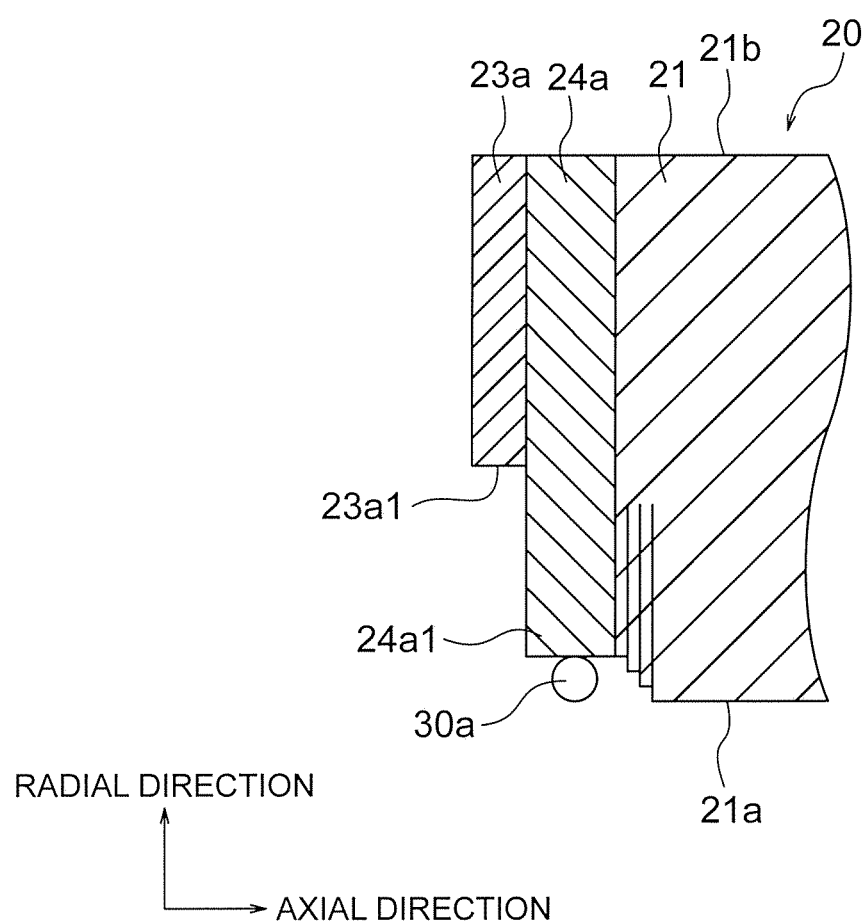
FIG. 3 is a view for illustrating an end surface of the stator taken along the line III-III of FIG. 2.

An inspection method for a rotating electric machine, a rotating electric machine, and an inspection system for a rotating electric machine according to a first embodiment of the present invention are described. In this embodiment, a turbine generator 100 is exemplified as the rotating electric machine. FIG. 1 is a sectional view for illustrating a configuration of the turbine generator 100 according to this embodiment. In FIG. 1, a configuration of only one side with respect to an axis center 11 of the turbine generator 100 is illustrated. A right-and-left direction of FIG. 1 indicates an axial direction of the turbine generator 100, and an up-and-down direction of FIG. 1 indicates a radial direction of the turbine generator 100. In a range illustrated in FIG. 1, a lower side indicates a radially inner side, that is, an inner peripheral side, and an upper side indicates a radially outer side, that is, an outer peripheral side. FIG. 2 is a view for illustrating a configuration of a part of a stator 20 in the turbine generator 100 according to this embodiment as viewed along the axial direction. FIG. 3 is a view for illustrating an end surface of the stator 20 taken along the line III-III of FIG. 2. In FIG. 3, only a part of one end side of the stator 20 in the axial direction is illustrated.

As illustrated in FIG. 1 to FIG. 3, the turbine generator 100 includes a frame 10, the stator 20, and a rotor 40. The stator 20 has a cylindrical shape and is fixed to an inner side of the frame 10. The rotor 40 is rotatably provided on an inner peripheral side of the stator 20.

The rotor 40 includes a rotation shaft 41 and a rotor main body 42. The rotation shaft 41 is connected to a motor (not shown). The rotor main body 42 is provided coaxially with the rotation shaft 41. The rotation shaft 41 is supported on the frame 10 so as to be rotatable about the axis center 11. The rotor main body 42 includes a rotor core 43, and a plurality of rotor coils (not shown) provided to the rotor core 43. A pair of retaining rings 44a and 44b are mounted to both end portions of the rotor core 43.

Both end portions of the rotor coils are provided so as to project from both the end portions of the rotor core 43 in the axial direction. The retaining ring 44a and the retaining ring 44b retain both the end portions of the rotor coils, respectively, from the outer peripheral side in order to prevent both the end portions of the rotor coils from being deformed by a centrifugal force caused by rotation of the rotor 40. That is, the retaining ring 44a and the retaining ring 44b are provided on outer peripheral sides of both the end portions of the rotor coils. The retaining ring 44a and the retaining ring 44b each have a cylindrical shape. The retaining ring 44a is shrink fitted to an outer peripheral surface of one axial end portion of the rotor core 43 to be fixed and mounted to the one axial end portion of the rotor core 43. The retaining ring 44a is shrink fitted also to an outer peripheral surface of an end plate 45 (see FIG. 4) having an annular shape arranged on the one axial end side of the rotor core 43. The retaining ring 44b is shrink fitted to an outer peripheral surface of the other axial end portion of the rotor core 43 to be fixed and mounted to the other axial end portion of the rotor core 43. The retaining ring 44b is shrink fitted also to an outer peripheral surface of an end plate (not shown) having an annular shape arranged on the other axial end side of the rotor core 43. In this embodiment, two retaining rings 44a and 44b are used for one turbine generator 100.

A predetermined pattern, which is to be imaged by an image pickup element 30a described later, is formed on at least a part of an outer peripheral surface of the retaining ring 44a. Similarly, a predetermined pattern, which is to be imaged by an image pickup element 30b described later, is formed on at least a part of an outer peripheral surface of the retaining ring 44b. The patterns formed on the outer peripheral surfaces of the retaining ring 44a and the retaining ring 44b are formed by using, for example, two colors having a large difference in contrast such as white and black. For example, when the pattern is to be formed on the outer peripheral surface of the retaining ring 44a, a white coating material is evenly applied to the entire outer peripheral surface of the retaining ring 44a, and, then, a black coating material is applied to the outer peripheral surface of the retaining ring 44a such that a plurality of black dots are irregularly arranged. The size of each of the plurality of dots is from several μm to several mm. When a digital image correlation method described later is used, as the size of each of the plurality of dots becomes smaller so that intervals between the plurality of dots become smaller, resolution of distortion is improved. In this embodiment, the predetermined patterns are formed on the outer peripheral surfaces of the retaining ring 44a and the retaining ring 44b such that sufficient resolution is obtained with respect to a distortion change assumed to be caused in the retaining ring 44a and the retaining ring 44b.

The patterns formed on the outer peripheral surfaces of the retaining ring 44a and the retaining ring 44b are not limited to those formed by application of the coating materials, and may be formed by adhering sheets on which patterns are formed. Further, the patterns formed on the outer peripheral surfaces of the retaining ring 44a and the retaining ring 44b may be patterns originally included in materials of the retaining ring 44a and the retaining ring 44b, or patterns generated when the retaining ring 44a and the retaining ring 44b are processed in a manufacturing process.

The stator 20 has a cylindrical shape as a whole, and is provided so as to surround an outer periphery of the rotor 40. An inner peripheral surface of the stator 20 is opposed to an outer peripheral surface of the rotor main body 42. The stator 20 includes a stator core 21 having a cylindrical shape, and a stator coil mounted to the stator core 21. Further, the stator 20 includes a pair of fastening plates 23a and 23b arranged on both axial ends of the stator core 21, a plurality of finger plates 24a provided between the fastening plate 23a and the stator core 21, and a plurality of finger plates 24b provided between the fastening plate 23b and the stator core 21.

The stator core 21 has a configuration in which a plurality of core plates are laminated in the axial direction. On an inner peripheral side of the stator core 21, there are provided a plurality of core teeth 26 each extending to the radially inner side from a core back having an annular shape, and slots 25 each provided between two core teeth 26 adjacent to each other in the circumferential direction. That is, on the inner peripheral side of the stator core 21, the plurality of slots 25 and the plurality of core teeth 26 are alternately arranged in the circumferential direction. The stator coil extends straight in the axial direction in each slot 25. The stator coil pulled out from an axial end portion of one slot 25 is folded back as a stator coil end 22a or a stator coil end 22b on an outer side of the stator core 21, and is inserted into another slot 25.

The pair of fastening plates 23a and 23b are provided on outer sides of both ends of the stator core 21 in the axial direction, respectively, so as to sandwich the stator core 21 from both end sides in the axial direction. The pair of fastening plates 23a and 23b are fixed to each other using a through bolt (not shown) passing through the stator core 21 in the axial direction. The fastening plate 23a and the fastening plate 23b each have an annular shape, and are provided over the entire circumferential direction. One or more fastening plates 23a and one or more fastening plates 23b are installed in the axial direction. One or more through bolts are used for the pair of fastening plates 23a and 23b. With this, surface pressure in the axial direction acts on the stator core 21, and the rigidity of the entire stator core 21 is increased, thereby suppressing vibration that may be caused in the stator core 21 when the turbine generator 100 is operated.

The fastening plate 23a and the fastening plate 23b are installed in a range on the outer peripheral side with respect to a wall surface 25a of the core back forming each slot 25 in the radial direction. That is, an inner peripheral surface 23a1 of the fastening plate 23a and an inner peripheral surface 23b1 of the fastening plate 23b are each located on the outer peripheral side with respect to the wall surface 25a. Thus, the surface pressure in the axial direction, which is caused by the fastening plate 23a and the fastening plate 23b, is less liable to act on the core teeth 26 formed on the inner peripheral side with respect to the wall surface 25a. The plurality of finger plates 24a and the plurality of finger plates 24b are provided so that the surface pressure in the axial direction sufficiently acts also on the core teeth 26. A material of each of the plurality of finger plates 24a and the plurality of finger plates 24b is a metal material such as stainless steel. The plurality of finger plates 24a are provided between the fastening plate 23a and one axial end surface of the stator core 21. Each of the plurality of finger plates 24a extends to the inner peripheral side with respect to the inner peripheral surface 23a1 of the fastening plate 23a as viewed along the axial direction. Similarly, the plurality of finger plates 24b are provided between the fastening plate 23b and the other axial end surface of the stator core 21. Each of the plurality of finger plates 24b extends to the inner peripheral side with respect to the inner peripheral surface 23b1 of the fastening plate 23b as viewed along the axial direction.

Each of the plurality of finger plates 24a has a rectangular parallelepiped shape elongated in one direction. Each finger plate 24a is provided such that a longitudinal direction thereof extends along a radial direction of the stator core 21. A length of each finger plate 24a in the longitudinal direction generally matches a radial distance from a distal end surface of each core tooth 26, that is, an inner peripheral surface 21a of the stator core 21 to an outer peripheral surface 21b of the stator core 21. Further, each finger plate 24a is arranged on one axial end side of each core tooth 26 so as to overlap each core tooth 26 as viewed along the axial direction. That is, the number of finger plates 24a matches the number of core teeth 26.

Each of the plurality of finger plates 24b has a configuration similar to that of each of the plurality of finger plates 24a. Each finger plate 24b is arranged on the other axial end side of each core tooth 26 so as to overlap each core tooth 26 as viewed along the axial direction. That is, the number of finger plates 24b matches the number of core teeth 26.

Each of all the core teeth 26 is sandwiched by one finger plate 24a and one finger plate 24b from both axial end sides. With this, the surface pressure in the axial direction from the fastening plate 23a and the fastening plate 23b is transmitted to each core tooth 26 via one finger plate 24a and one finger plate 24b. With this, the rigidity of the entire stator core 21 is increased. Here, the plurality of finger plates 24a and the plurality of finger plates 24b may each be formed of a material other than metal such as a resin material as long as the material has the rigidity that allows the surface pressure in the axial direction from the fastening plate 23a and the fastening plate 23b to be transmitted to each core tooth 26. Further, the shape of each of the plurality of finger plates 24a and the plurality of finger plates 24b is not limited to the rectangular parallelepiped shape.

In a manufacturing process of the stator core 21, each finger plate 24a is fixed to a core plate located on one endmost side in the axial direction among the plurality of core plates forming the stator core 21, through spot welding or the like. Similarly, each finger plate 24b is fixed to a core plate located on the other endmost side in the axial direction among the plurality of core plates forming the stator core 21, through spot welding or the like. After the plurality of core plates are laminated in the axial direction, the pair of fastening plates 23a and 23b are installed, and the pair of fastening plates 23a and 23b are fixed using the through bolt.

The rotor main body 42 is magnetized by causing a field current to flow through the rotor coils. The rotor main body 42 is rotated by a rotational force transmitted from the motor via the rotation shaft 41. When the rotor main body 42 is rotated, an induced current flows through the stator coil of the stator 20. In the turbine generator 100, power is generated by taking out the current flowing through the stator coil. In order to suppress a temperature rise in the frame 10 due to the power generation, refrigerant circulates through the frame 10. A gas cooler 12 is provided to the frame 10 so as to cool the refrigerant.

Further, the turbine generator 100 in this embodiment includes the image pickup element 30a and the image pickup element 30b. The image pickup element 30a is configured to image the pattern formed on the outer peripheral surface of the retaining ring 44a. The image pickup element 30b is configured to image the pattern formed on the outer peripheral surface of the retaining ring 44b. Both the image pickup element 30a and the image pickup element 30b are mounted to a non-rotating portion inside the frame 10 in the turbine generator 100. Here, the non-rotating portion refers to a portion that does not rotate in the turbine generator 100, that is, a portion of the turbine generator 100 excluding the rotor 40. The non-rotating portion includes at least the stator 20 and the frame 10. Each of the image pickup element 30a and the image pickup element 30b is configured to output data of an acquired digital image to a calculation device 200 described later. The image pickup element 30a is mounted to the non-rotating portion of the turbine generator 100. Thus, power supply to the image pickup element 30a and data output from the image pickup element 30a are possible even during an operation period of the turbine generator 100. Similarly, the image pickup element 30b is mounted to the non-rotating portion of the turbine generator 100. Thus, power supply to the image pickup element 30b and data output from the image pickup element 30b are possible even during the operation period of the turbine generator 100.

In this embodiment, the image pickup element 30a is mounted to the finger plate 24a which is a part of the stator 20. The finger plate 24a is a member provided close to the retaining ring 44a with a gap 46a interposed therebetween. Specifically, the image pickup element 30a is mounted to an end portion 24a1 located on the inner peripheral side of the stator 20 in one finger plate 24a. For the mounting of the image pickup element 30a, for example, welding, adhesion, or fitting using a wedge is used. The end portion 24a1 of the finger plate 24a is opposed to a part of the outer peripheral surface of the retaining ring 44a in the circumferential direction through the gap 46a. With this, the image pickup element 30a is mounted so as to be opposed to the outer peripheral surface of the retaining ring 44a through the gap 46a. An imaging direction of the image pickup element 30a is a direction directed toward the axis center 11 along the radial direction as indicated by the arrow in FIG. and FIG. 4 referred to below. Through rotation of the retaining ring 44a which is a part of the rotor 40, the image pickup element 30a can image the pattern formed on the outer peripheral surface of the retaining ring 44a over the entire circumference. The image pickup element 30a is mounted to the finger plate 24a, thereby being capable of suppressing a decrease in strength of the turbine generator 100, which may be caused by mounting the image pickup element 30a. It is preferred that the image pickup element 30a be mounted so as to be opposed to the outer peripheral surface of the retaining ring 44a even when the image pickup element 30a is mounted to the non-rotating portion other than the finger plate 24a.

Similarly, the image pickup element 30b is mounted to the finger plate 24b which is a part of the stator 20. The finger plate 24b is a member provided close to the retaining ring 44b with a gap 46b interposed therebetween. Specifically, the image pickup element 30b is mounted to an end portion 24b1 located on the inner peripheral side of the stator 20 in one finger plate 24b. For the mounting of the image pickup element 30b, for example, welding, adhesion, or fitting using a wedge is used. The end portion 24b1 of the finger plate 24b is opposed to a part of the outer peripheral surface of the retaining ring 44b in the circumferential direction through the gap 46b. With this, the image pickup element 30b is mounted so as to be opposed to the outer peripheral surface of the retaining ring 44b through the gap 46b. An imaging direction of the image pickup element 30b is a direction directed toward the axis center 11 along the radial direction as indicated by the arrow in FIG. 1. Through rotation of the retaining ring 44b which is a part of the rotor 40, the image pickup element 30b can image the pattern formed on the outer peripheral surface of the retaining ring 44b over the entire circumference. The image pickup element 30b is mounted to the finger plate 24b, thereby being capable of suppressing a decrease in strength of the turbine generator 100, which may be caused by mounting the image pickup element 30b. It is preferred that the image pickup element 30b be mounted so as to be opposed to the outer peripheral surface of the retaining ring 44b even when the image pickup element 30b is mounted to the non-rotating portion other than the finger plate 24b.

The finger plate 24a to which the image pickup element 30a is mounted and the finger plate 24b to which the image pickup element 30b is mounted may overlap each other as viewed along the axial direction, or may be shifted from each other in the circumferential direction as viewed along the axial direction.

A defect such as cracking or breakage is liable to occur in a shrink fitting portion of the retaining ring 44a which is shrink fitted to the rotor core 43 or the end plate 45. Thus, it is preferred that the image pickup element 30a be mounted so as to be opposed to the shrink fitting portion of the retaining ring 44a such that at least the shrink fitting portion of the retaining ring 44a can be imaged over the entire circumference. Similarly, it is preferred that the image pickup element 30b be mounted so as to be opposed to the shrink fitting portion of the retaining ring 44b such that at least the shrink fitting portion of the retaining ring 44b can be imaged over the entire circumference.

In this embodiment, one image pickup element is provided for one retaining ring, but a plurality of image pickup elements may be provided for one retaining ring. In this case, the plurality of image pickup elements are provided at positions shifted from each other in the circumferential direction or the axial direction of the retaining ring.

Figure 4:
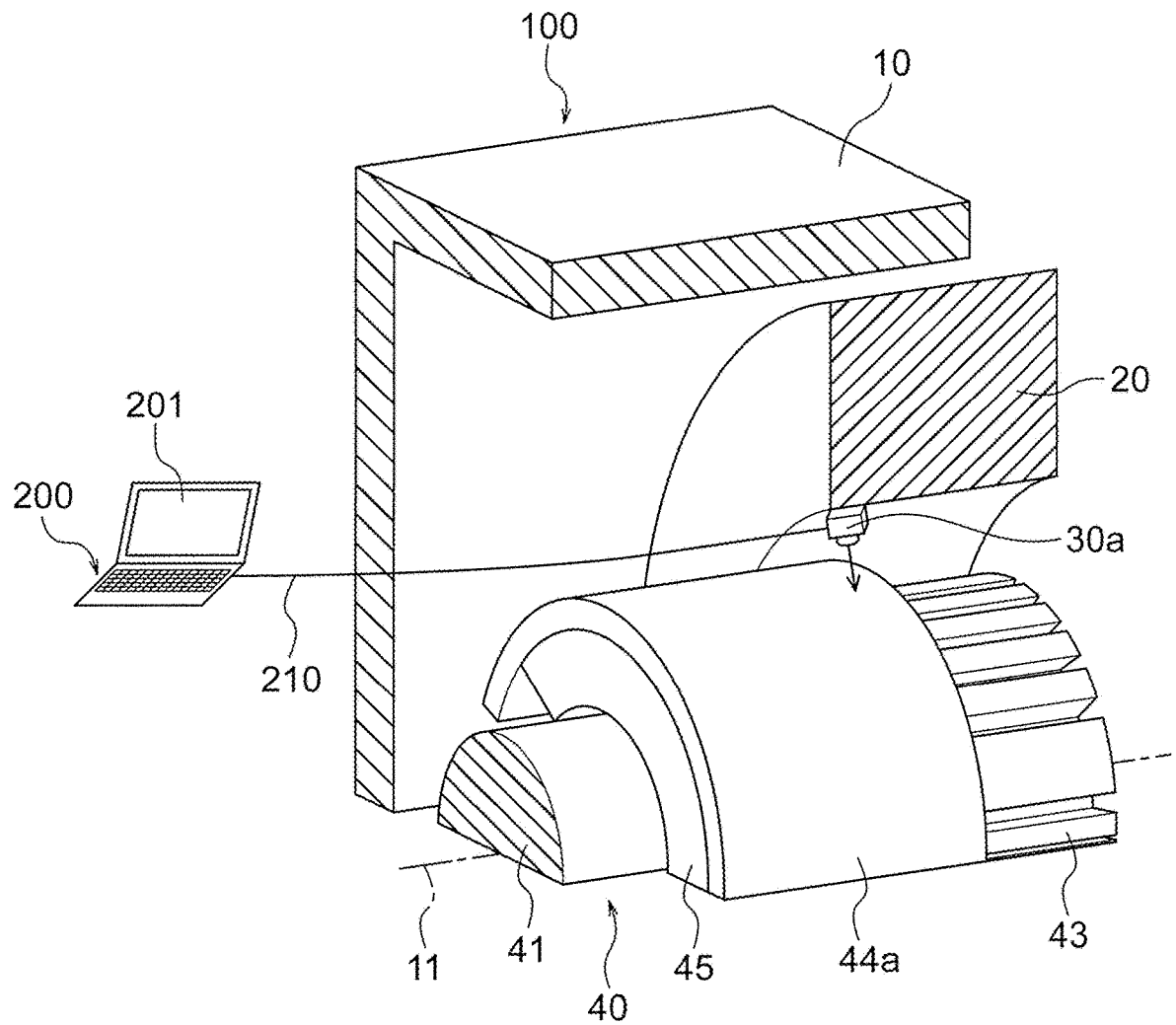
FIG. 4 is a view for illustrating a schematic configuration of an inspection system for the turbine generator according to the first embodiment of the present invention.

FIG. 4 is a view for illustrating a schematic configuration of an inspection system for the turbine generator 100 according to this embodiment. As illustrated in FIG. 4, the inspection system according to this embodiment includes the turbine generator 100, and the calculation device 200 connected to the turbine generator 100 via a communication line 210. The calculation device 200 is a computer including a processor, a storage device, an input/output interface circuit, a communication device, and the like as a hardware configuration. The calculation device 200 functions as image analysis means when a program stored in the storage device is executed by the processor. That is, the calculation device 200 is configured to perform image analysis using an image acquired from the image pickup element 30a to acquire a distortion distribution of the retaining ring 44a. Although not illustrated in FIG. 4, the calculation device 200 is configured to perform image analysis using an image acquired from the image pickup element 30b to acquire a distortion distribution of the retaining ring 44b. The calculation device 200 further includes a display unit 201 configured to display information. A personal computer can be used as the calculation device 200. The connection between the turbine generator 100 and the calculation device 200 is not limited to wired connection via the communication line 210, and may be wireless connection.

Figure 5:
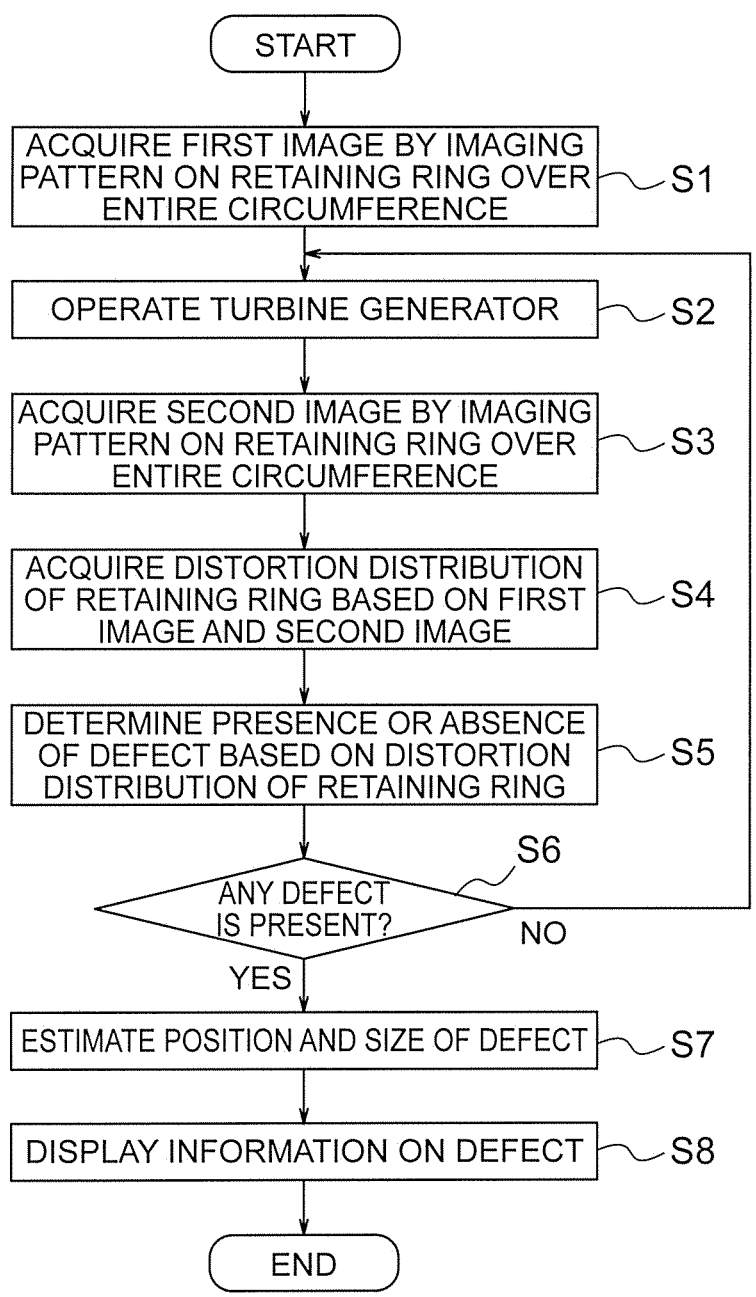
FIG. 5 is a flowchart for illustrating a schematic flow of an inspection method for the turbine generator according to the first embodiment of the present invention.

FIG. 5 is a flowchart for illustrating a schematic flow of an inspection method for the turbine generator 100 according to this embodiment. In processes illustrated in FIG. 5, at least a process of Step S1 and processes of Step S3 to Step S8 are executed by the calculation device 200. In the inspection method for the turbine generator 100 according to this embodiment, the retaining ring 44a and the retaining ring 44b are each inspected. In the following, a method of inspecting the retaining ring 44a is described, but a method of inspecting the retaining ring 44b is performed similarly.

First, the calculation device 200 acquires a first image (Step S1). The first image is acquired by imaging the pattern formed on the outer peripheral surface of the retaining ring 44a over the entire circumference of the retaining ring 44a with use of the image pickup element 30a under a state in which the retaining ring 44a is rotated. The first image is a reference image when the distortion distribution of the retaining ring 44a is acquired. Thus, it is preferred that the first image be acquired at a time point at which the distortion that occurs in the retaining ring 44a is relatively small, that is, at a time point at which an operating time from the manufacture of the turbine generator 100 is as short as possible. For example, the first image is acquired at the time of an adjustment test of the turbine generator 100. The adjustment test of the turbine generator 100 is performed after the manufacture of the turbine generator 100 is completed and before the turbine generator 100 is shipped. However, the first image may be acquired during the operation period of the turbine generator 100 after the shipping and subsequent installation of the turbine generator 100 are completed. For example, the first image may be acquired during low-speed rotation in the middle of activation or in the middle of stop of the turbine generator 100, or the first image may be acquired during a rated operation of the turbine generator 100. In any case, the first image is acquired under a state in which the retaining ring 44a is rotated.

The first image may include one two-dimensional image in which the pattern of the retaining ring 44a over the entire circumference is developed, or may include a plurality of two-dimensional images in which the pattern of the retaining ring 44a over the entire circumference is divided for each part in the circumferential direction.

Next, the calculation device 200 acquires the second image (Step S3) after the first image is acquired with an operation of the turbine generator 100 (Step S2) interposed. Similarly to the first image, the second image is acquired by imaging the pattern formed on the outer peripheral surface of the retaining ring 44a over the entire circumference of the retaining ring 44a with use of the image pickup element 30a under a state in which the retaining ring 44a is rotated. That is, the second image is acquired under a state in which the retaining ring 44a is rotated during the operation of the turbine generator 100 such as during low-speed rotation in the middle of activation or in the middle of stop of the turbine generator 100 or during the rated operation of the turbine generator 100.

The second image can be acquired at any timing as long as the operation of the turbine generator 100 in which the retaining ring 44a may be deformed by a centrifugal force is interposed after the first image is acquired. For example, the calculation device 200 acquires the second image when an operation time of the turbine generator 110 after the first image is acquired exceeds a threshold time.

Similarly to the first image, the second image may include one two-dimensional image in which the pattern of the retaining ring 44a over the entire circumference is developed, or may include a plurality of two-dimensional images in which the pattern of the retaining ring 44a over the entire circumference is divided for each part in the circumferential direction.

Next, the calculation device 200 acquires the distortion distribution of the retaining ring 44a based on the first image and the second image (Step S4). When the calculation device 200 acquires the distortion distribution of the retaining ring 44a, the calculation device 200 uses, for example, the digital image correlation method. The digital image correlation method is a method of obtaining a deformation amount and a deformation direction at each position of a surface of an object based on a change in a brightness distribution in two images obtained by imaging the surface of the object before and after deformation. The digital image correlation method is based on a concept that a pattern on the surface of the object moves together with the surface of the object and a feature of the pattern is stored before and after deformation. Through use of the digital image correlation method, the deformation amount and the deformation direction at each position of the outer peripheral surface of the retaining ring 44a from acquisition of the first image to acquisition of the second image are obtained based on the change in the brightness distribution in the first image and the second image. That is, the distortion distribution of the outer peripheral surface of the retaining ring 44a from acquisition of the first image to acquisition of the second image is obtained. Based on the distortion distribution of the outer peripheral surface of the retaining ring 44a, not only the presence or absence of a defect in the retaining ring 44a can be determined, but also the position and size of the defect can be estimated.

Here, when the distortion distribution of the retaining ring 44a is to be acquired based on the first image and the second image, the calculation device 200 can also use a method other than the digital image correlation method, for example, a moire method.

Next, the calculation device 200 determines the presence or absence of a defect in the retaining ring 44a based on the distortion distribution of the outer peripheral surface of the retaining ring 44a (Step S5 and Step S6). When it is determined that a defect is present in the retaining ring 44a, the processing proceeds to Step S7.

In Step S7, the calculation device 200 estimates the position and size of the defect in the retaining ring 44a based on the distortion distribution of the outer peripheral surface of the retaining ring 44a. With this, information on the position and size of the defect in the retaining ring 44a, that is, information on the degree of breakage of the retaining ring 44a can be quantitatively acquired in a non-destructive and non-contact manner without pulling out the rotor 40 from the stator 20.

Next, in Step S8, the calculation device 200 performs a process of causing the display unit 201 to display the information on the defect. The information to be displayed on the display unit 201 includes at least information that a defect is present in the retaining ring 44a, and, as required, also includes the information on the position and size of the defect in the retaining ring 44a.

On the other hand, when it is determined in Step S6 that no defect is present in the retaining ring 44a, the processing returns to Step S2, and the second image is acquired again (Step S3) at any timing with the operation of the turbine generator 100 (Step S2) interposed. After that, the calculation device 200 executes the processes of Step S4 to Step S6 again based on the already acquired first image and the newly acquired second image. With this, the distortion distribution of the retaining ring 44a is acquired again, and the presence or absence of a defect is determined again based on the distortion distribution. When the distortion distribution is acquired two times or more, a change in the distortion distribution may be acquired based on the distortion distribution acquired in the past and the newly acquired distortion distribution, and the presence or absence of a defect may be determined based on the change in the distortion distribution.

As described above, the inspection method for the turbine generator 100 according to this embodiment is the inspection method for the turbine generator 100 to be executed by the calculation device 200, and includes a first step (Step S1 of FIG. 5), a second step (Step S3 of FIG. 5), and a third step (Step S4 of FIG. 5). The first step is a step of acquiring the first image by imaging the pattern formed on the outer peripheral surface of the retaining ring 44*a* mounted to the axial end portion of the rotor core 43 of the turbine generator 100 over the entire circumference of the retaining ring 44*a* with use of the image pickup element 30*a* mounted to the non-rotating portion of the turbine generator 100 under the state in which the retaining ring 44*a* is rotated. The second step is executed after the first step with the operation of the turbine generator 100 interposed, and is a step of acquiring the second image by imaging the pattern over the entire circumference of the retaining ring 44*a* with use of the image pickup element 30*a* under the state in which the retaining ring 44*a* is rotated. The third step is a step of acquiring the distortion distribution of the retaining ring 44*a* based on the first image and the second image. Here, the turbine generator 100 is an example of the rotating electric machine. The calculation device 200 is an example of the computer.

According to this configuration, through acquisition of the distortion distribution of the retaining ring 44*a* based on the first image and the second image, the retaining ring 44*a* can be inspected. Thus, the retaining ring 44*a* can be inspected in real time in a non-destructive and non-contact manner without pulling out the rotor 40 from the stator 20. Accordingly, according to this embodiment, the retaining ring 44*a* can be inspected during the operation period of the turbine generator 100.

Further, according to the above-mentioned configuration, based on the distortion distribution of the retaining ring 44*a*, the degree of breakage of the retaining ring 44*a* can be quantitatively grasped. In general, when damage to the retaining ring 44*a* is confirmed by visual inspection, repair or replacement of the retaining ring 44*a* is immediately required. As a result, a timing of repair or replacement cannot be adjusted. In contrast, according to this embodiment, an operable period of the turbine generator 100 can be grasped in accordance with the quantitative degree of breakage of the retaining ring 44*a*. Thus, the retaining ring 44*a* can be repaired or replaced at an appropriate timing by adjusting an allowable rotation speed of the turbine generator 100. Further, according to this embodiment, the degree of breakage of the retaining ring 44*a* can be grasped based on the distortion distribution of the retaining ring 44*a*, thereby being capable of grasping a defect inside the retaining ring 44*a* that cannot be recognized by visual inspection.

The turbine generator 100 according to this embodiment includes: the non-rotating portion including the stator 20; the rotor 40 rotatably provided to the inner peripheral side of the stator 20; and the image pickup element 30*a* mounted to the non-rotating portion. The rotor 40 includes the rotor core 43, and the retaining ring 44*a* mounted to the end portion of the rotor core 43 in the axial direction of the rotor 40. The image pickup element 30*a* is configured to image a pattern formed on the outer peripheral surface of the retaining ring 44*a*. Here, the turbine generator 100 is an example of the rotating electric machine.

According to this configuration, without pulling out the rotor 40 from the stator 20, the retaining ring 44*a* can be inspected using the image acquired by the image pickup element 30*a*. Further, according to this configuration, the retaining ring 44*a* can be inspected in real time in a non-destructive and non-contact manner. Thus, according to this embodiment, the retaining ring 44*a* can be inspected during the operation period of the turbine generator 100.

Further, according to the above-mentioned configuration, through imaging of the pattern on the outer peripheral surface of the rotating retaining ring 44*a* by the fixed image pickup element 30*a*, the image of the pattern on the retaining ring 44*a* over the entire circumference can be acquired. Thus, according to this embodiment, a mechanism configured to move the image pickup element 30*a* in the circumferential direction can be omitted.

In the turbine generator 100 according to this embodiment, the stator 20 includes the stator core 21, the fastening plate 23*a* which has an annular shape, and is provided to the outer side of the stator core 21 in the axial direction, and the finger plate 24*a* which is provided between the stator core 21 and the fastening plate 23*a*, and extends to the inner peripheral side with respect to the inner peripheral surface 23*a*1 of the fastening plate 23*a*. The image pickup element 30*a* is mounted to the finger plate 24*a*.

The finger plates 24*a* are normally provided close to the outer peripheral side of the retaining ring 44*a*. Thus, according to the above-mentioned configuration, the image pickup element 30*a* can be arranged close to the outer peripheral surface of the retaining ring 44*a*. With this, the resolution of the image to be acquired by the image pickup element 30*a* can be increased, thereby being capable of improving the resolution of distortion. Thus, according to this embodiment, the detection accuracy of the defect in the retaining ring 44*a* can be improved.

The inspection system for the turbine generator 100 according to this embodiment includes: the turbine generator 100 according to this embodiment; and the calculation device 200 configured to acquire the distortion distribution of the retaining ring 44*a* based on the image acquired from the image pickup element 30*a*. Here, the turbine generator 100 is an example of the rotating electric machine. The calculation device 200 is an example of the computer.

According to this configuration, without pulling out the rotor 40 from the stator 20, the retaining ring 44*a* can be inspected using the image acquired by the image pickup element 30*a*. Further, according to this configuration, the retaining ring 44*a* can be inspected in real time in a non-destructive and non-contact manner. Thus, according to this embodiment, the retaining ring 44*a* can be inspected during the operation period of the turbine generator 100.

Second Embodiment

Figure 6:
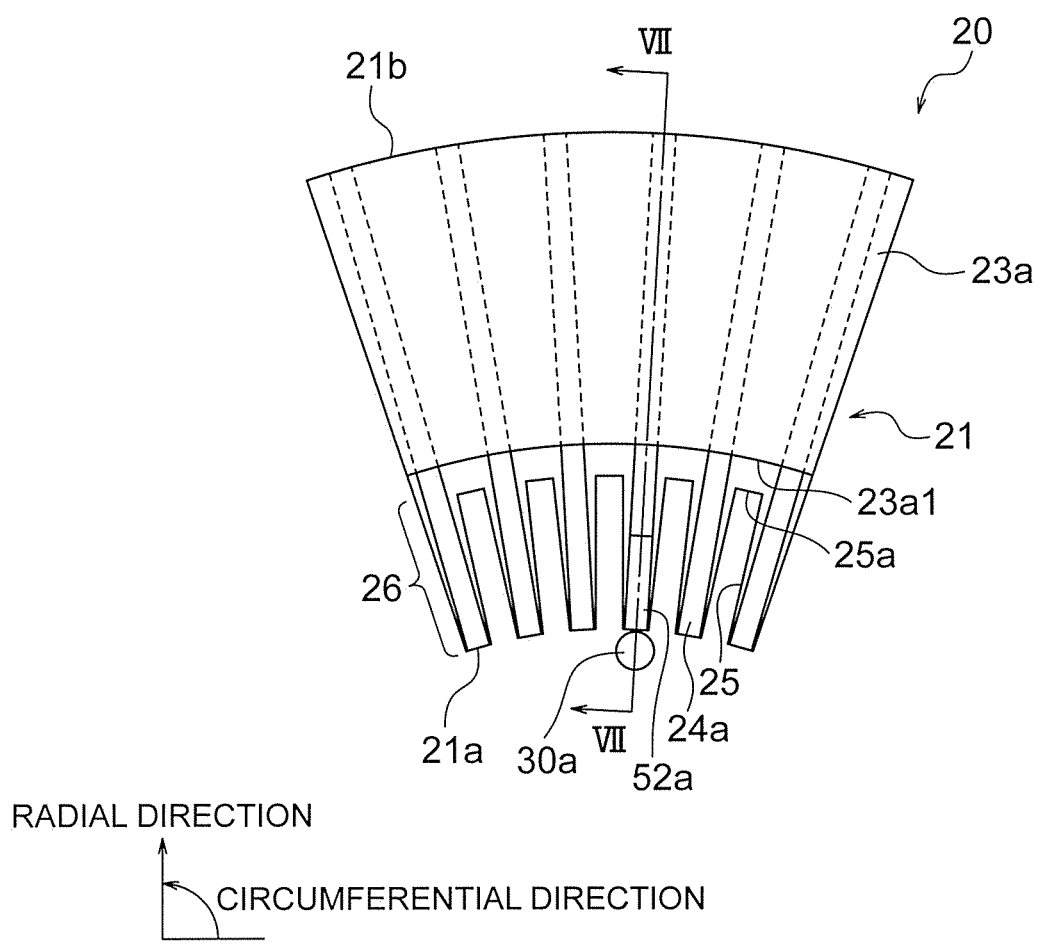
FIG. 6 is a view for illustrating a configuration of a part of the stator in a turbine generator according to a second embodiment of the present invention as viewed along the axial direction.
Figure 7:
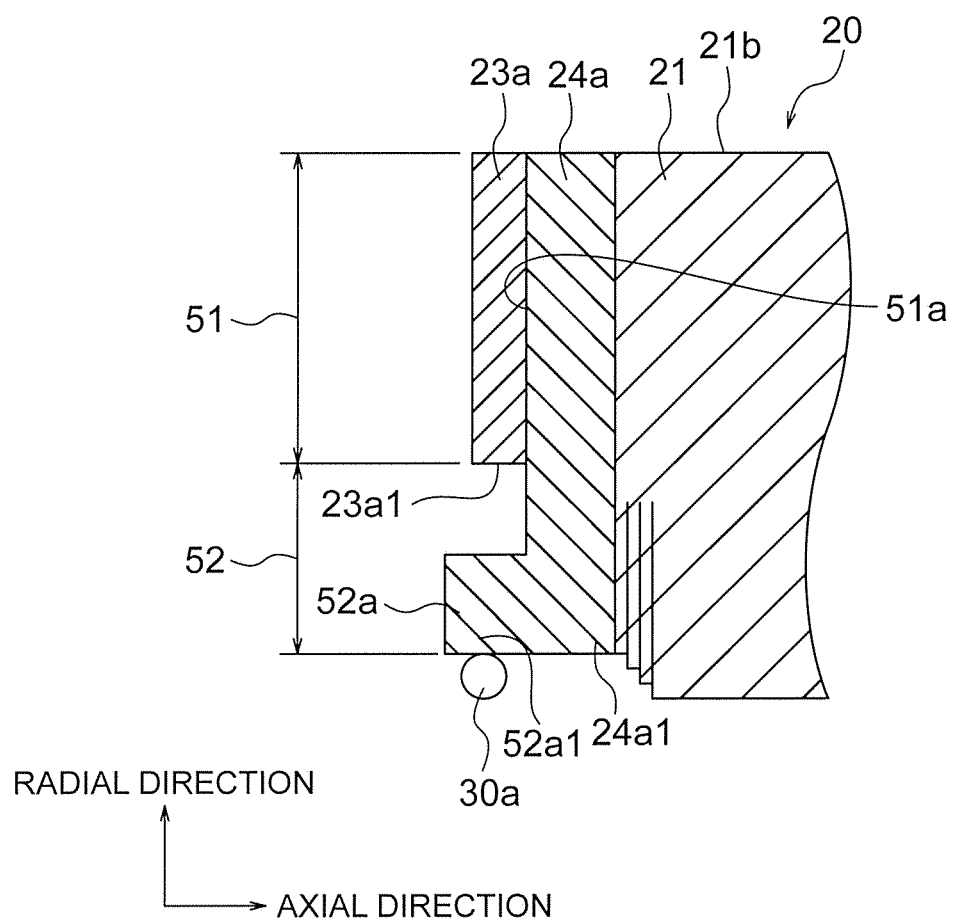
FIG. 7 is a view for illustrating an end surface of the stator taken along the line VII-VII of FIG. 6.

A rotating electric machine according to a second embodiment of the present invention is described. FIG. 6 is a view for illustrating a configuration of a part of the stator 20 in the turbine generator 100 according to this embodiment as viewed along the axial direction. FIG. 7 is a view for illustrating an end surface of the stator 20 taken along the line VII-VII of FIG. 6. In the following, only the finger plate 24*a* and the image pickup element 30*a* are described, but the same applies to the finger plate 24*b* and the image pickup element 30*b*. Components having the same functions and actions as those of the first embodiment are denoted by the same reference symbols, and description thereof is omitted. Further, the inspection method for the turbine generator 100 is the same as that of the first embodiment.

As illustrated in FIG. 6 and FIG. 7, the finger plate 24a includes a first portion 51 and a second portion 52. The first portion 51 overlaps the fastening plate 23a as viewed along the axial direction. The second portion 52 is located on the inner peripheral side with respect to the inner peripheral surface 23a1 of the fastening plate 23a. As a matter of course, the second portion 52 of the finger plate 24a is located on the inner peripheral side with respect to the first portion 51 of the finger plate 24a. The first portion 51 has a contact surface 51a to be in contact with the fastening plate 23a. The second portion 52 includes a protruding portion 52a protruding outward from the contact surface 51a in the axial direction at at least a part thereof. The protruding portion 52a of the second portion 52 protrudes in a direction away from the stator core 21. The image pickup element 30a is mounted to the protruding portion 52a. The image pickup element 30a is mounted to, for example, an end portion 52a1 located on the inner peripheral side in the protruding portion 52a. In this embodiment, among the plurality of finger plates 24a, only the finger plate 24a to which the image pickup element 30a is mounted includes the protruding portion 52a. The configurations of the finger plates 24a to which the image pickup element 30a is not mounted are the same as the configurations of the finger plates 24a of the first embodiment.

A method of manufacturing the finger plate 24a including the protruding portion 52a is briefly described. Similarly to the material of the finger plate 24a of the first embodiment, the material of the finger plate 24a is a metal material such as stainless steel. First, a member having a rectangular parallelepiped shape is integrally formed using drawing. After that, a part of the member having a rectangular parallelepiped shape is scraped off to form the contact surface 51a and the protruding portion 52a. Through those steps, the finger plate 24a including the protruding portion 52a is manufactured. The manufactured finger plate 24a is fixed to the core plate located on the outermost side in the axial direction through spot welding or the like.

The finger plate 24a may be formed of a material other than metal such as a resin material as long as required rigidity is obtained.

As described above, in the turbine generator 100 according to this embodiment, the finger plate 24a includes the first portion 51 that overlaps the fastening plate 23a as viewed along the axial direction, and the second portion 52 located on the inner peripheral side with respect to the inner peripheral surface 23a1 of the fastening plate 23a. The first portion 51 has the contact surface 51a to be in contact with the fastening plate 23a. The second portion 52 includes the protruding portion 52a protruding outward from the contact surface 51a in the axial direction. The image pickup element 30a is mounted to the protruding portion 52a.

According to this configuration, even when a perforation process is performed on the protruding portion 52a in order to mount the image pickup element 30a, a decrease in the rigidity of a main body of the finger plate 24a can be suppressed. With this, the surface pressure in the axial direction can be caused to act on the stator core 21 so that the rigidity of the entire stator core 21 can be increased, thereby being capable of suppressing vibration that may be caused in the stator core 21 when the turbine generator 100 is operated. Thus, according to this embodiment, effects similar to those of the first embodiment are obtained, and in addition, damage to the turbine generator 100 that may be caused by installation of the image pickup element 30a can be prevented more reliably.

Third Embodiment

Figure 8:
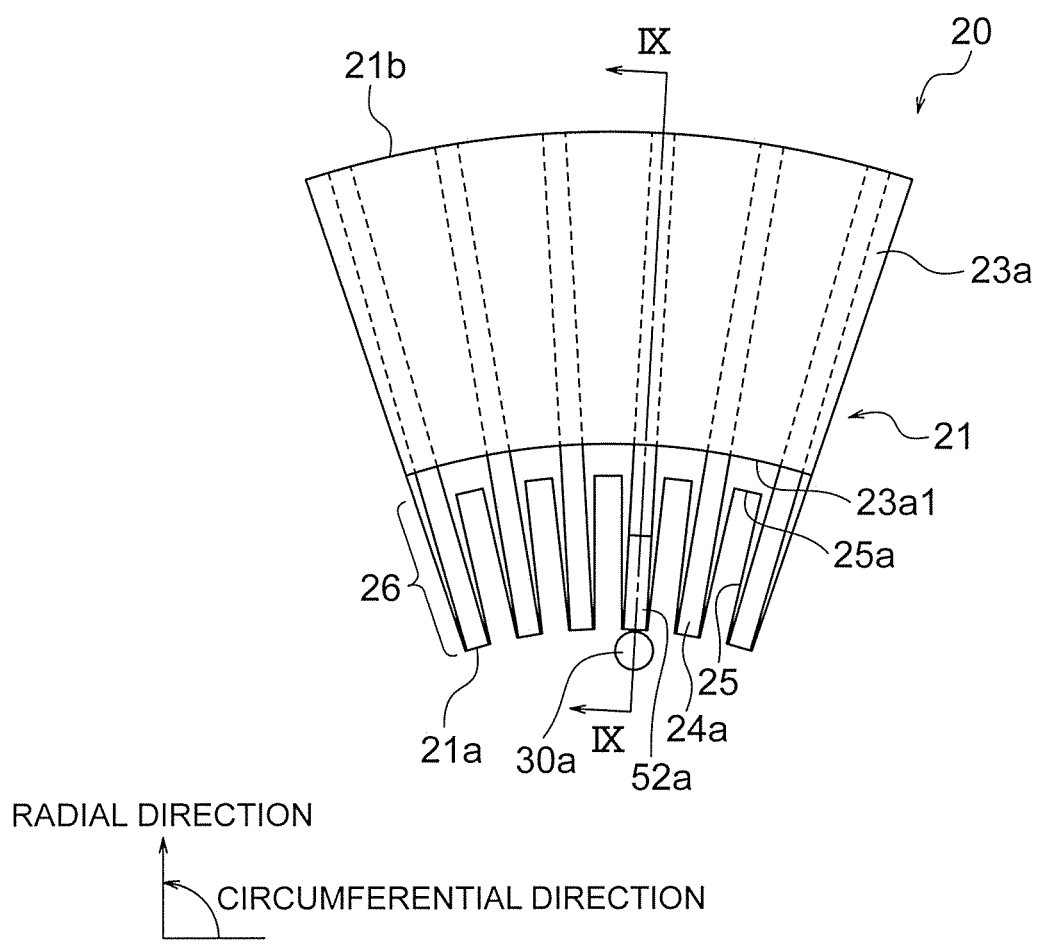
FIG. 8 is a view for illustrating a configuration of a part of the stator in a turbine generator according to a third embodiment of the present invention as viewed along the axial direction.
Figure 9:
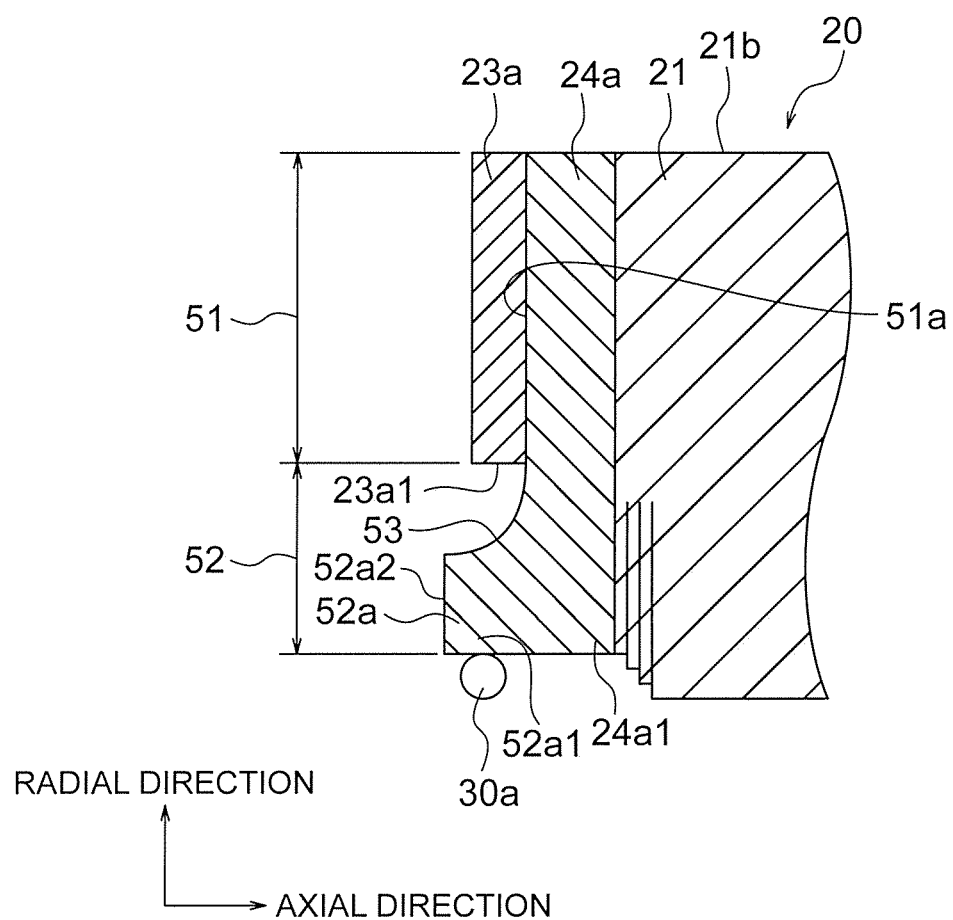
FIG. 9 is a view for illustrating an end surface of the stator taken along the line IX-IX of FIG. 8.

A rotating electric machine according to a third embodiment of the present invention is described. FIG. 8 is a view for illustrating a configuration of a part of the stator 20 in the turbine generator 100 according to this embodiment as viewed along the axial direction. FIG. 9 is a view for illustrating an end surface of the stator 20 taken along the line IX-IX of FIG. 8. Components having the same functions and actions as those of the first or second embodiment are denoted by the same reference symbols, and description thereof is omitted. Further, the inspection method for the turbine generator 100 is the same as that of the first embodiment.

As illustrated in FIG. 8 and FIG. 9, the protruding portion 52a includes a protruding end surface 52a2 located on the outer side with respect to the contact surface 51a in the axial direction. The protruding end surface 52a2 is connected to the contact surface 51a through intermediation of a concave curved surface 53. The concave curved surface 53 is smoothly connected to the contact surface 51a. Due to the formation of the concave curved surface 53, an axial dimension of the second portion 52 of the finger plate 24a, that is, a dimension of the second portion 52 in the right-and-left direction of FIG. 9 gradually increases as separating away from the first portion 51. The curvature of the concave curved surface 53 is set in accordance with the degree of stress relaxation required.

With the surface pressure applied to the stator core 21 by the fastening plate 23a, the finger plate 24a receives a reaction force directed outward in the axial direction from the stator core 21. The finger plate 24a receives the above-mentioned reaction force not only at the first portion 51 in contact with the fastening plate 23a but also at the second portion 52 not in contact with the fastening plate 23a. Thus, in the finger plate 24a, there is generated a bending stress in which the inner side in the axial direction, that is, the stator core 21 side corresponds to a tension side, and the outer side in the axial direction, that is, the fastening plate 23a side corresponds to a compression side. When such a bending stress is generated in the finger plate 24a, stress concentration occurs in the boundary portion between the first portion 51 and the second portion 52. In this embodiment, the contact surface 51a and the protruding end surface 52a2 of the protruding portion 52a are connected to each other through intermediation of the concave curved surface 53, thereby being capable of relaxing the stress concentration that occurs in the boundary portion between the first portion 51 and the second portion 52.

As described above, in the turbine generator 100 according to this embodiment, the protruding portion 52a includes the protruding end surface 52a2 located on the outer side with respect to the contact surface 51a in the axial direction. The protruding end surface 52a2 is connected to the contact surface 51a through intermediation of the concave curved surface 53.

According to this configuration, the stress concentration that occurs in the boundary portion between the first portion 51 and the second portion 52 can be relaxed, thereby being capable of preventing breakage of the finger plate 24a. Thus, according to this embodiment, effects similar to those of the first and second embodiments can be obtained, and damage to the turbine generator 100 can be prevented more reliably.

Fourth Embodiment

Figure 10:
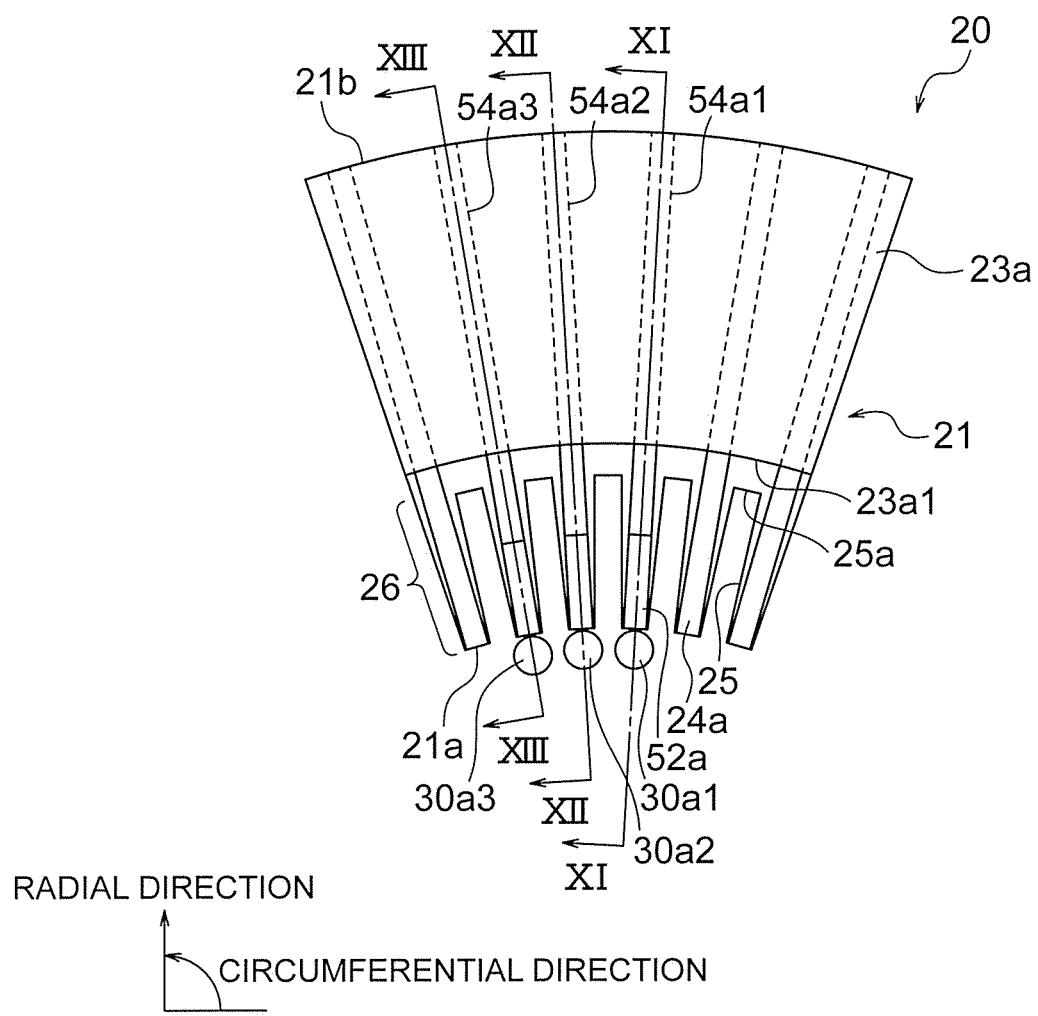
FIG. 10 is a view for illustrating a configuration of a part of the stator in a turbine generator according to a fourth embodiment of the present invention as viewed along the axial direction.
Figure 11:
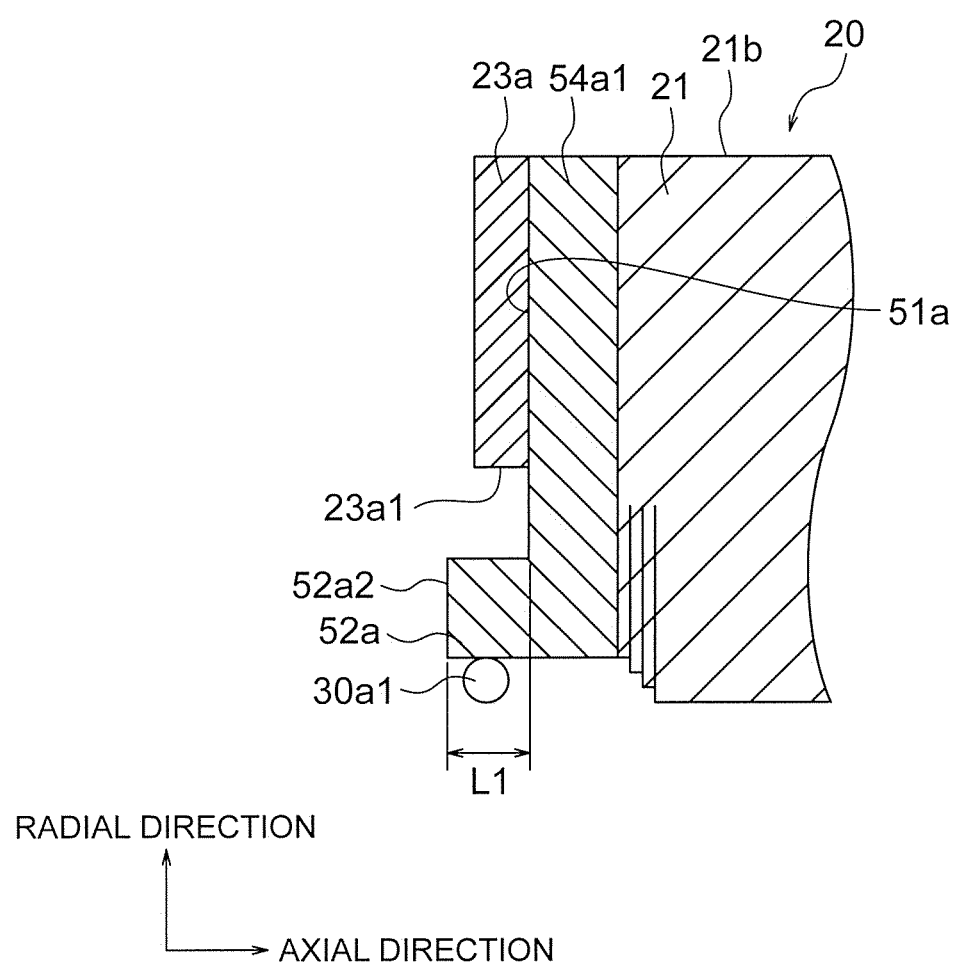
FIG. 11 is a view for illustrating an end surface of the stator taken along the line XI-XI of FIG. 10.
Figure 12:
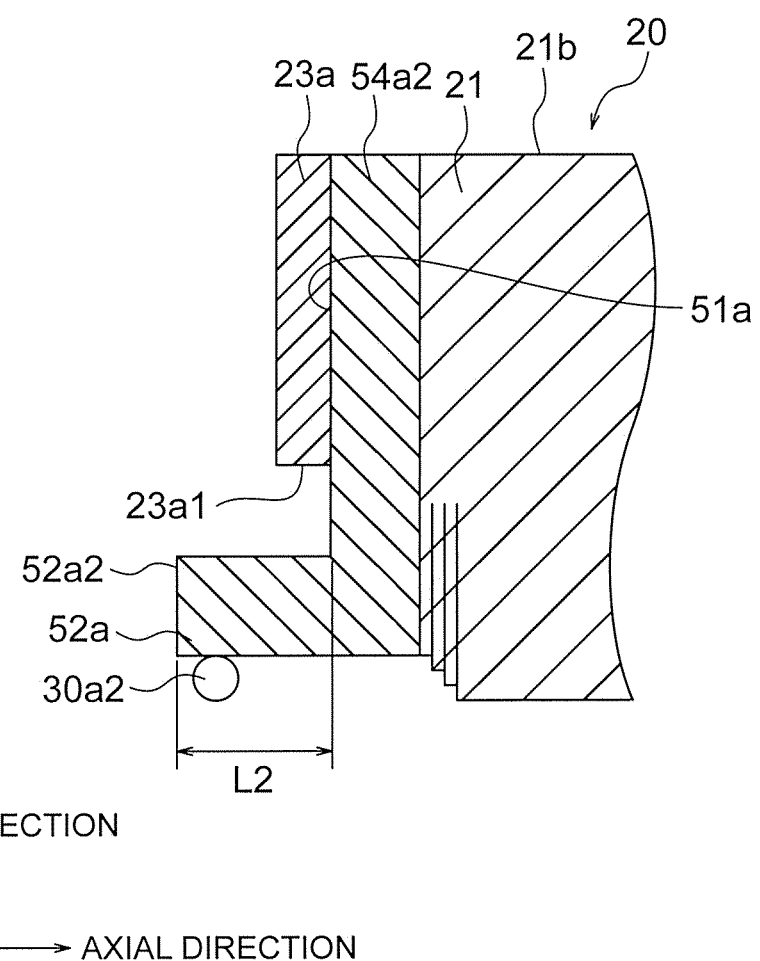
FIG. 12 is a view for illustrating an end surface of the stator taken along the line XII-XII of FIG. 10.
Figure 13:
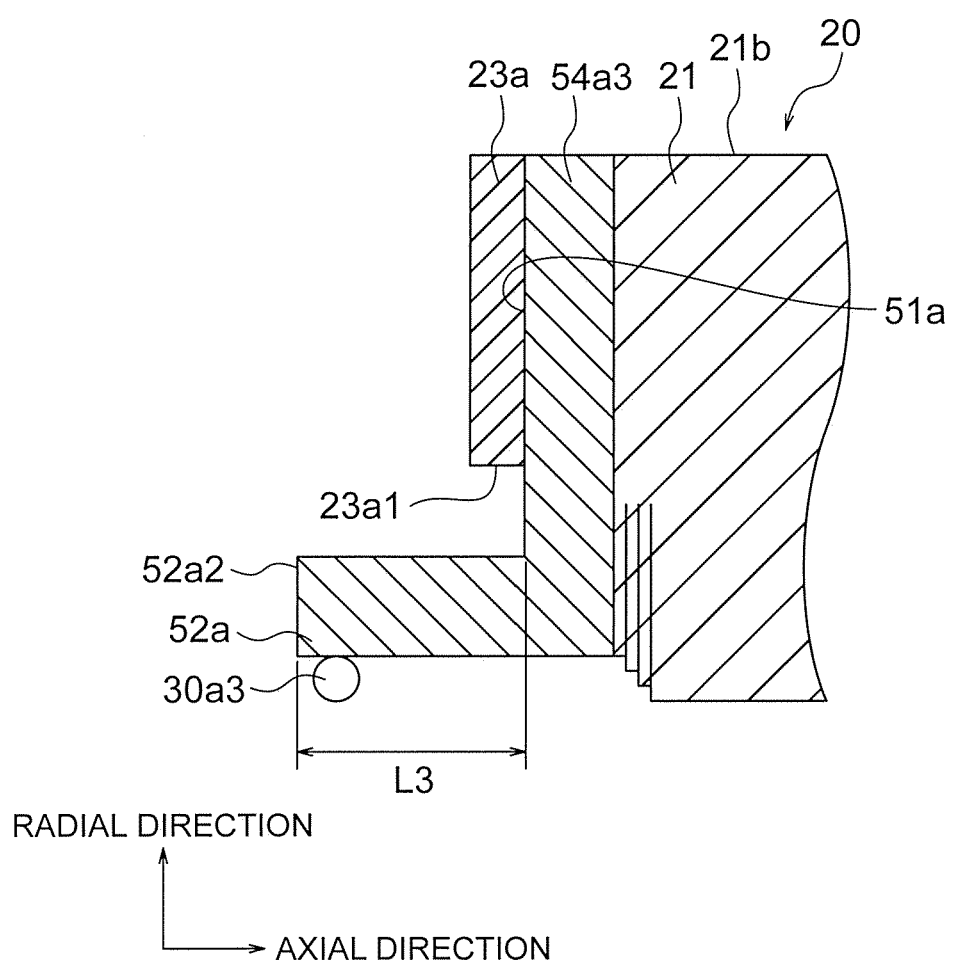
FIG. 13 is a view for illustrating an end surface of the stator taken along the line XIII-XIII of FIG. 10.

A rotating electric machine according to a fourth embodiment of the present invention is described. FIG. 10 is a view for illustrating a configuration of a part of the stator 20 in the turbine generator 100 according to this embodiment as viewed along the axial direction. FIG. 11 is a view for illustrating an end surface of the stator 20 taken along the line XI-XI of FIG. 10. FIG. 12 is a view for illustrating an end surface of the stator 20 taken along the line XII-XII of FIG. 10. FIG. 13 is a view for illustrating an end surface of the stator 20 taken along the line XIII-XIII of FIG. 10. Components having the same functions and actions as those of any of the first to third embodiments are denoted by the same reference symbols, and description thereof is omitted. Further, the inspection method for the turbine generator 100 is the same as that of the first embodiment.

As illustrated in FIG. 10 to FIG. 13, the stator 20 in this embodiment includes a first finger plate 54$a$1, a second finger plate 54$a$2, and a third finger plate 54$a$3 as a part of the plurality of finger plates 24$a$. The first finger plate 54$a$1, the second finger plate 54$a$2, and the third finger plate 54$a$3 are arranged at different positions in the circumferential direction. A first image pickup element 30$a$1 is mounted to the first finger plate 54$a$1. A second image pickup element 30$a$2 is mounted to the second finger plate 54$a$2. A third image pickup element 30$a$3 is mounted to the third finger plate 54$a$3.

In an example illustrated in FIG. 10, the first finger plate 54$a$1 and the second finger plate 54$a$2 are adjacent to each other in the circumferential direction, but the first finger plate 54$a$1 and the second finger plate 54$a$2 may not be adjacent to each other. Similarly, in the example illustrated in FIG. 10, the second finger plate 54$a$2 and the third finger plate 54$a$3 are adjacent to each other in the circumferential direction, but the second finger plate 54$a$2 and the third finger plate 54$a$3 may not be adjacent to each other.

Similarly to the finger plate 24$a$ illustrated in FIG. 7, each of the first finger plate 54$a$1, the second finger plate 54$a$2, and the third finger plate 54$a$3 includes a protruding portion 52$a$ protruding outward from the contact surface 51$a$ in the axial direction.

As illustrated in FIG. 11, an axial length of the protruding portion 52$a$ of the first finger plate 54$a$1 is L1. The first image pickup element 30$a$1 is mounted closer to the protruding end surface 52$a$2 in the protruding portion 52$a$ of the first finger plate 54$a$1.

As illustrated in FIG. 12, an axial length of the protruding portion 52$a$ of the second finger plate 54$a$2 is L2. The axial length L2 is larger than the axial length L1 (L2>L1). The second image pickup element 30$a$2 is mounted closer to the protruding end surface 52$a$2 in the protruding portion 52$a$ of the second finger plate 54$a$2. The second image pickup element 30$a$2 is arranged at a position more away from the stator core 21 in the axial direction than in the first image pickup element 30$a$1.

As illustrated in FIG. 13, an axial length of the protruding portion 52$a$ of the third finger plate 54$a$3 is L3. The axial length L3 is further larger than the axial length L2 (L3>L2). The third image pickup element 30$a$3 is mounted closer to the protruding end surface 52$a$2 in the protruding portion 52$a$ of the third finger plate 54$a$3. The third image pickup element 30$a$3 is arranged at a position much more away from the stator core 21 in the axial direction than in the second image pickup element 30$a$2.

The first image pickup element 30$a$1, the second image pickup element 30$a$2, and the third image pickup element 30$a$3 are mounted so as to be opposed to different axial positions of the outer peripheral surface of the retaining ring 44$a$, respectively. With this, in the first image pickup element 30$a$1, the second image pickup element 30$a$2, and the third image pickup element 30$a$3, the outer peripheral surface of the retaining ring 44$a$ is imaged at the plurality of axial positions with high resolution.

As described above, in the turbine generator 100 according to this embodiment, the finger plate includes the first finger plate 54$a$1, and the second finger plate 54$a$2 provided at a circumferential position different from a circumferential position of the first finger plate 54$a$1. The image pickup element includes the first image pickup element 30$a$1 mounted to the protruding portion 52$a$ of the first finger plate 54$a$1, and the second image pickup element 30$a$2 mounted to the protruding portion 52$a$ of the second finger plate 54$a$2. The length L2 of the protruding portion 52$a$ of the second finger plate 54$a$2 in the axial direction is larger than the length L1 of the protruding portion 52$a$ of the first finger plate 54$a$1 in the axial direction. The second image pickup element 30$a$2 is arranged at a position more away from the stator core 21 in the axial direction than in the first image pickup element 30$a$1.

According to this configuration, with the first image pickup element 30$a$1 and the second image pickup element 30$a$2, the pattern on the outer peripheral surface of the retaining ring 44$a$ can be imaged at the plurality of axial positions. Thus, without providing a mechanism configured to move the image pickup element in the axial direction, the image of the outer peripheral surface of the retaining ring 44$a$ can be acquired at the plurality of axial positions. Thus, according to this embodiment, effects similar to those of the first to third embodiments are obtained, and in addition, the retaining ring 44$a$ can be inspected over a wide range in the axial direction while complication of the structure of the turbine generator 100 is suppressed.

Fifth Embodiment

Figure 14:
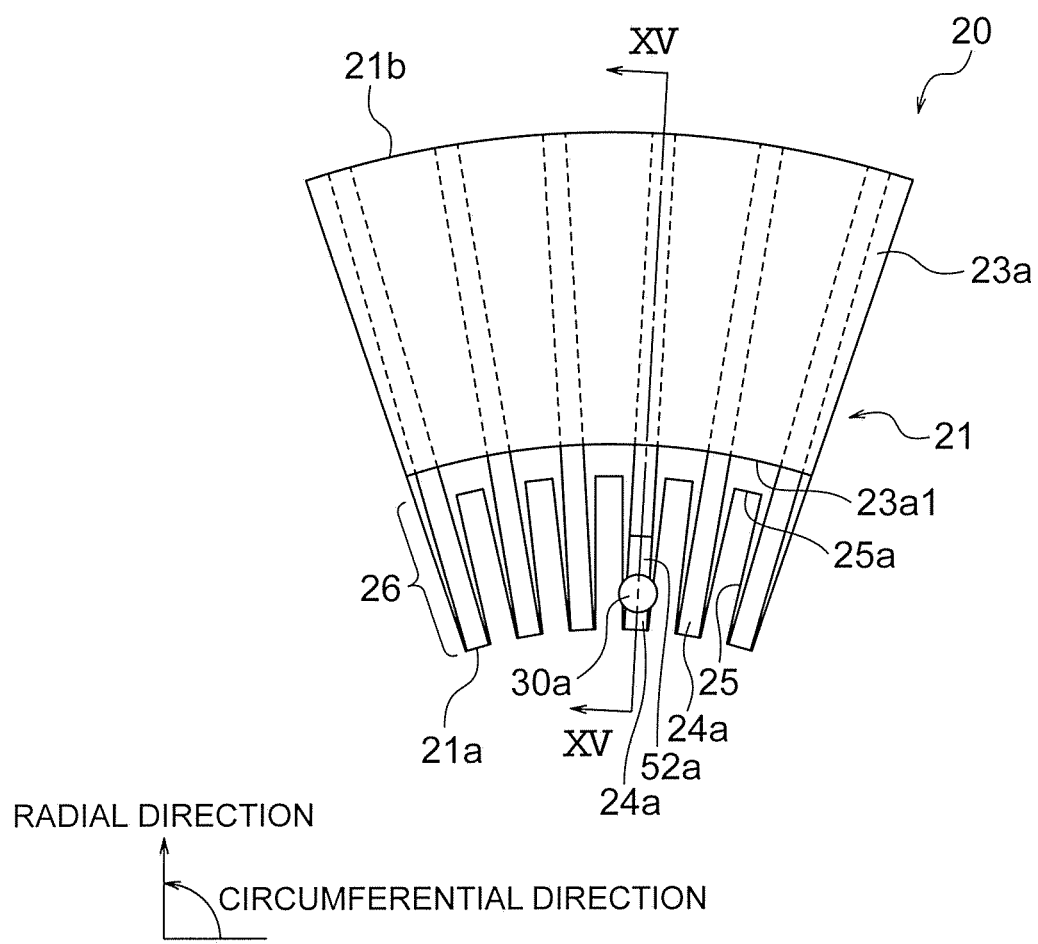
FIG. 14 is a view for illustrating a configuration of a part of the stator 20 in the turbine generator 100 according to a fifth embodiment of the present invention as viewed along the axial direction.
Figure 15:
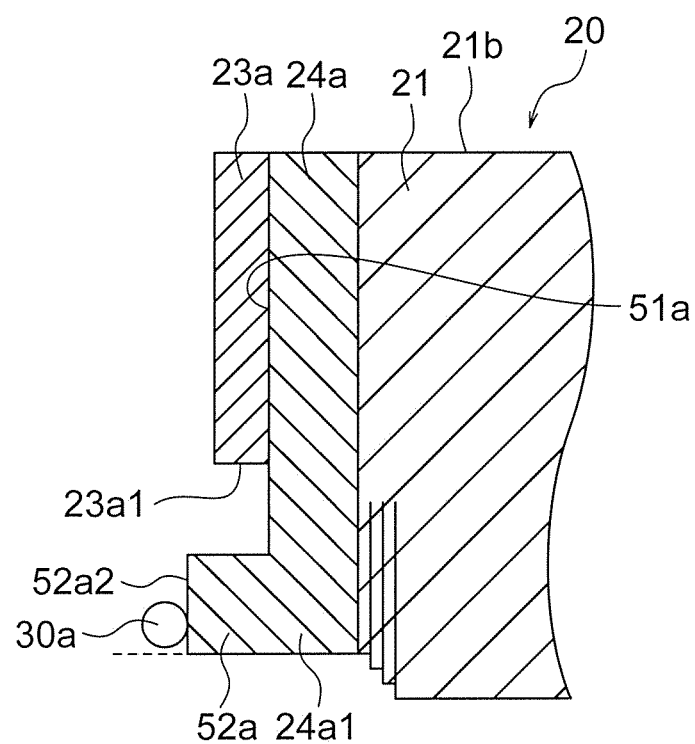
FIG. 15 is a view for illustrating an end surface of the stator 20 taken along the line XV-XV of FIG. 14.

A rotating electric machine according to a fifth embodiment of the present invention is described. FIG. 14 is a view for illustrating a configuration of a part of the stator 20 in the turbine generator 100 according to this embodiment as viewed along the axial direction. FIG. 15 is a view for illustrating an end surface of the stator 20 taken along the line XV-XV of FIG. 14. Components having the same functions and actions as those of any of the first to fourth embodiments are denoted by the same reference symbols, and description thereof is omitted. Further, the inspection method for the turbine generator 100 is the same as that of the first embodiment.

As illustrated in FIG. 14 and FIG. 15, the image pickup element 30$a$ in this embodiment is mounted along an outer end surface of the finger plate 24$a$ in the axial direction. For example, when the finger plate 24$a$ has the protruding portion 52$a$, the image pickup element 30$a$ is mounted along the protruding end surface 52$a$2 of the protruding portion 52$a$. With this, as viewed along the axial direction, the image pickup element 30$a$ is arranged on the outer peripheral side with respect to the end portion 24$a$1 of the finger plate 24$a$ on the inner peripheral side (that is, the upper side with respect to the broken line of FIG. 15). The image pickup element 30$a$ is mounted such that the entire image pickup element 30$a$ is located within a range on the outer peripheral side with respect to the end portion 24$a$1.

As described above, in the turbine generator 100 according to this embodiment, the image pickup element 30$a$ is arranged on the outer peripheral side with respect to the end portion 24$a$1 of the finger plate 24$a$ on the inner peripheral side as viewed along the axial direction.

According to this configuration, the accuracy of axial alignment, which is required when the rotor 40 is pulled out from or inserted into the stator 20 at the time of manufacture and precision inspection, is at the same level as that without the image pickup element 30a. Thus, according to this embodiment, effects similar to those of the first to third embodiments are obtained, and in addition, the manufacturing process and the precision inspection process of the turbine generator 100 can be simplified or shortened.

The first to fifth embodiments described above may be carried out in combination with each other.

REFERENCE SIGNS LIST 10 frame, 11 axis center, 12 gas cooler, 20 stator, stator core, 21a inner peripheral surface, 21b outer peripheral surface, 22a, 22b stator coil end, 23a, 23b fastening plate, 23a1, 23b1 inner peripheral surface, 24a, 24b finger plate, 24a1, 24b1 end portion, 25 slot, 25a wall surface, 30a, 30b image pickup element, 30a1 first image pickup element, 30a2 second image pickup element, 30a3 third image pickup element, 40 rotor, 41 rotation shaft, 42 rotor main body, 43 rotor core, 44a, 44b retaining ring, 45 end plate, 46a, 46b gap, 51 first portion, 51a contact surface, 52 second portion, 52a protruding portion, 52a1 end portion, 52a2 protruding end surface, 53 concave curved surface, 54a1 first finger plate, 54a2 second finger plate, 54a3 third finger plate, 100 turbine generator, 200 calculation device, 201 display unit, 210 communication line

The invention claimed is:

1. An inspection method for a rotating electric machine, comprising:
    a first step of acquiring a first image by imaging a pattern formed on an outer peripheral surface of a retaining ring mounted to an axial end portion of a rotor core of the rotating electric machine over an entire circumference of the retaining ring with use of an image pickup element mounted to a non-rotating portion of the rotating electric machine under a state in which the retaining ring is rotated;
    a second step of acquiring a second image by imaging the pattern over the entire circumference of the retaining ring with use of the image pickup element under the state in which the retaining ring is rotated, the second step being executed after the first step with an operation of the rotating electric machine interposed; and
    a third step of acquiring a distortion distribution of the retaining ring based on the first image and the second image.

2. A rotating electric machine, comprising:
    a non-rotating portion including a stator;
    a rotor rotatably provided to an inner peripheral side of the stator; and
    an image pickup element mounted to the non-rotating portion,
    wherein the rotor includes:
        a rotor core; and
        a retaining ring mounted to an end portion of the rotor core in an axial direction of the rotor, and
    wherein the image pickup element is configured to image a pattern formed on an outer peripheral surface of the retaining ring.

3. The rotating electric machine according to claim 2, wherein the stator includes:
    a stator core;
    a fastening plate which has an annular shape, and is provided to an outer side of the stator core in the axial direction; and
    a finger plate which is provided between the stator core and the fastening plate, and extends to an inner peripheral side with respect to an inner peripheral surface of the fastening plate,
    wherein the image pickup element is mounted to the finger plate.

4. The rotating electric machine according to claim 3, wherein the finger plate includes:
    a first portion that overlaps the fastening plate as viewed along the axial direction; and
    a second portion located on the inner peripheral side with respect to the inner peripheral surface of the fastening plate,
    wherein the first portion has a contact surface to be in contact with the fastening plate,
    wherein the second portion includes a protruding portion protruding outward from the contact surface in the axial direction, and
    wherein the image pickup element is mounted to the protruding portion.

5. The rotating electric machine according to claim 4, wherein the protruding portion has a protruding end surface located on an outer side with respect to the contact surface in the axial direction, and
    wherein the protruding end surface is connected to the contact surface through intermediation of a concave curved surface.

6. The rotating electric machine according to claim 4, wherein the finger plate includes:
    a first finger plate; and
    a second finger plate provided at a circumferential position different from a circumferential position of the first finger plate,
    wherein the image pickup element includes:
        a first image pickup element mounted to the protruding portion of the first finger plate; and
        a second image pickup element mounted to the protruding portion of the second finger plate,
    wherein a length of the protruding portion of the second finger plate in the axial direction is larger than a length of the protruding portion of the first finger plate in the axial direction, and
    wherein the second image pickup element is arranged at a position more away from the stator core in the axial direction than in the first image pickup element.

7. The rotating electric machine according to claim 3, wherein the image pickup element is arranged on an outer peripheral side with respect to an end portion of the finger plate on the inner peripheral side as viewed along the axial direction.

8. An inspection system for a rotating electric machine, comprising:
    the rotating electric machine of claim 2; and
    a computer configured to acquire a distortion distribution of the retaining ring based on two images acquired using the image pickup element.

* * * * *